(12) United States Patent
Zeidler et al.

(10) Patent No.: US 7,116,377 B2
(45) Date of Patent: Oct. 3, 2006

(54) GRAPHICS SUBSYSTEM BYPASS METHOD AND APPARATUS

(75) Inventors: David E. Zeidler, Warrington, PA (US); Robert M. Simons, Lansdale, PA (US); Joseph A. Petry, Philadelphia, PA (US)

(73) Assignee: General Instrument Corporation, Horsham, PA (US)

( * ) Notice: Subject to any disclaimer, the term of this patent is extended or adjusted under 35 U.S.C. 154(b) by 143 days.

(21) Appl. No.: 10/107,346

(22) Filed: Mar. 26, 2002

(65) Prior Publication Data

US 2003/0001970 A1  Jan. 2, 2003

Related U.S. Application Data

(63) Continuation of application No. PCT/US99/22305, filed on Sep. 27, 1999.

(51) Int. Cl.
*H04N 11/20* (2006.01)

(52) U.S. Cl. ................. 348/569; 348/458

(58) Field of Classification Search ............... 348/569, 348/564, 567, 584, 572, 589, 598, 553–555, 348/600; 725/151, 50, 39, 139
See application file for complete search history.

(56) References Cited

U.S. PATENT DOCUMENTS

| | | |
|---|---|---|
| 5,541,666 A | 7/1996 | Zeidler et al. |
| 5,638,112 A | 6/1997 | Bestler et al. |
| 6,034,738 A * | 3/2000 | Sparks ................. 348/564 |
| 6,177,961 B1 * | 1/2001 | Blatter ................. 348/563 |
| 6,305,021 B1 * | 10/2001 | Kim ..................... 725/131 |
| 6,346,927 B1 * | 2/2002 | Tran et al. ............... 345/1 |
| 6,348,955 B1 * | 2/2002 | Tait ...................... 348/731 |
| 6,363,213 B1 * | 2/2002 | Sparks et al. ........... 386/112 |
| 6,437,828 B1 * | 8/2002 | Chambers et al. ....... 348/458 |
| 6,556,251 B1 * | 4/2003 | Sorensen ............... 348/564 |
| 6,603,517 B1 * | 8/2003 | Shen et al. ............. 348/565 |

FOREIGN PATENT DOCUMENTS

| | | |
|---|---|---|
| EP | 0701367 | 3/1996 |
| GB | 2326551 | 12/1998 |

* cited by examiner

*Primary Examiner*—Paulos M. Natnael
(74) *Attorney, Agent, or Firm*—Thomas Bethea, Jr.

(57) ABSTRACT

The present invention provides an on-screen graphics (OSD) subsystem for overlaying OSD graphic images onto analog or digital video source signals. The OSD system has a video graphics bypass path and graphics bypass switch for directing an analog video channel around the OSD subsystem during time intervals when the OSD subsystem is not required to insert graphics into the source signal.

22 Claims, 2 Drawing Sheets

GRAPHICS SUBSYSTEM BYPASS METHOD AND APPARATUS

CROSS-REFERENCE TO RELATED APPLICATION

This application is a continuation of PCT International Application No. PCT/US99/22305, filed Sep. 27, 1999, which application is incorporated herein by reference.

BACKGROUND

The present invention relates to cable television (CATV) systems. More particularly, the present invention pertains to a method and apparatus for bypassing a digital on-screen display graphics insertion subsystem.

The wide spread use of analog video displays has created a need for displaying graphic images such as alphanumeric characters or other graphics along with analog video data. The graphics are typically laid over a video signal received from a separate remote source such as a broadcast television transmission, a video disk, a video tape or any other video source. Various arrangements are known for overlaying graphic images over a video signal received from such a separate remote video source.

U.S. Pat. No. 5,051,817 to Takano discloses a system for superimposing color characters on an input video signal. In this system, a first sync separator separates horizontal sync pulses from the input video signal. These horizontal sync pulses are used by a phase lock loop (PLL) circuit to generate a reference clock signal (P1) that is locked to the horizontal sync pulses of the input video signal. A second sync separator, a timing generator, a burst gate, and a second PLL circuit generate an oscillation output signal that is phase locked to a burst signal of the input video signal. The reference clock signal and the oscillation output signal are used to synchronize a generated character signal with the input video signal. A changeover signal generator generates changeover control signals to output only the input video signal, or the input video signal superimposed with color characters.

U.S. Pat. No. 5,541,666 to Zeidler et al. discloses a system for overlaying digital character signals on an analog source signal including a predetermined color sub-carrier which includes a sub-carrier phase locked loop, a digital character generating device, a digital video encoder and a switching device. The subscriber phase locked loop separately generates a color sub-carrier and a system clock signal which are locked to the color sub-carrier of the analog video source system. The digital character generating device detects horizontal and vertical timing of pixel information in the analog video source signal, and generates digital character signals that are to be overlaid in predetermined pixels of the analog video source signal. The digital video encoder is responsive to the color sub-carrier and system clock signals for generating a separate color sub-carrier which is locked to the color sub-carrier of the analog video source signal. The digital video encoder also converts the digital character signals from the digital character generating means into an analog video output signal that includes the color sub-carrier generated in the digital video encoder. The switching means directs the analog video output signal from the digital video encoder or the analog video source signal to an output of this system during times when the digital character is to be overlaid or not overlaid respectively on the analog video source signal.

A problem exists with these techniques in that insertion of digital information into an analog video source may only be required in certain time intervals. The insertion process inherently degrades the video signal. Signal degradation occurs both during time intervals when digital information is inserted and during time intervals when there is no digital information presented for insertion.

SUMMARY

It is therefore an object of the present invention to provide a method and apparatus for overlaying graphics on video signals and to bypass an OSD graphics subsystem for overlaying the graphics on the video signals during intervals when there are no graphics are presented for overlaying.

These and other objects have been achieved by providing a graphics subsystem for receiving digital video source signals or converting analog video source signals to digital video signals, inserting on screen display (OSD) graphics into the video source signals to form a composite digital signal and converting the composite digital signal to an analog video signal for output to a display. A graphics subsystem bypass circuit is provided for passing inbound analog video source signals directly to the display during intervals when no OSD graphics are present for overlaying.

BRIEF DESCRIPTION OF THE DRAWINGS

The invention will now be described by way of example with reference to the accompanying figures of which.

DESCRIPTION OF THE PREFERRED EMBODIMENT

Figure 1:
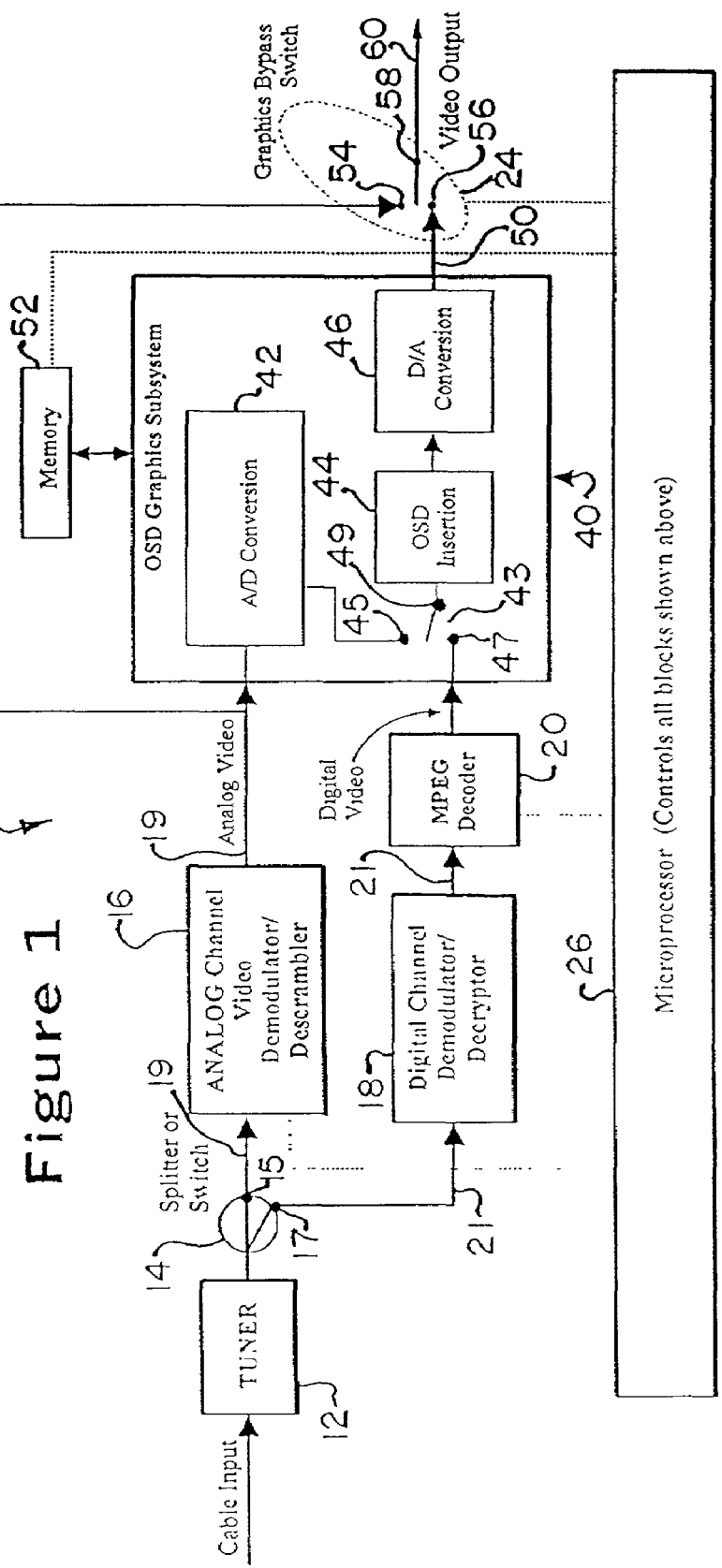
FIG. 1 is a block diagram of a system containing a graphics subsystem bypass according to the present invention.

FIG. 1 is a block diagram of a settop terminal 10. The settop terminal 10 contains a tuner 12 coupled to a cable input from a community antenna television (CATV) network. A switch 14 is coupled to the output of the tuner 12. It should be understood by those reasonably skilled in the art that the switch 14 may optionally be replaced by a splitter. Outputs 15, 17 of the switch 14 are coupled to an analog video path 19 and a digital video path 21 respectively. An analog channel video demodulator 16 is coupled to the first switch output 15 along the analog video path 19. It should be understood by those reasonably skilled in the art that the analog channel video demodulator 16 may also optionally include a descrambler in systems where the cable input is a scrambled signal.

A digital channel demodulator 18 is coupled to the second switch output 17 along the digital video path 21. It should be understood by those reasonably skilled in the art that the digital channel demodulator 18 may optionally include a decryptor for use in systems having encrypted digital information being passing through the tuner 12. A motion picture expert group (MPEG) decoder 20 is coupled to the output of the digital channel demodulator 18 within the digital video path 21. Both the analog video and digital video paths 19, 21 are coupled to an on-screen display (OSD) graphics subsystem 40.

The OSD graphics subsystem 40 includes an analog to digital (A/D) convertor 42 coupled to the analog video path 19 and a switch 43 having two inputs 45, 47. The inputs 45, 47 are coupled to the A/D convertor 42 and the MPEG decoder 20 respectively. Also included in the OSD graphics subsystem 40 is an OSD insertion unit 44 coupled to switch output 49, a digital to analog (D/A) convertor 46, which is coupled to the OSD insertion unit 44 and an output 50. The OSD graphics subsystem 40 including the A/D convertor 42, the switch 43, the OSD insertion unit 44 and the D/A convertor 46 may comprise a single chip or chip set, for example ATI Technologies Rage Pro and Rage Theatre. It should be recognized that other vendors offer similar chips or chip sets having these functions. Any such suitable chip or chip set having these functions could be utilized.

A graphics bypass switch 24, having two inputs 56, 54, is coupled to the OSD graphics subsystem output 50 and to an OSD bypass path 22. The bypass path 22 extends from the analog video path 19 to the graphics bypass switch input 54. A video output 60 is provided from the graphics bypass switch output 58. Memory 52 is coupled to the OSD graphics subsystem 40. Additionally, microprocessor 26 is provided for selectively controlling each of the components described above.

Figure 2:
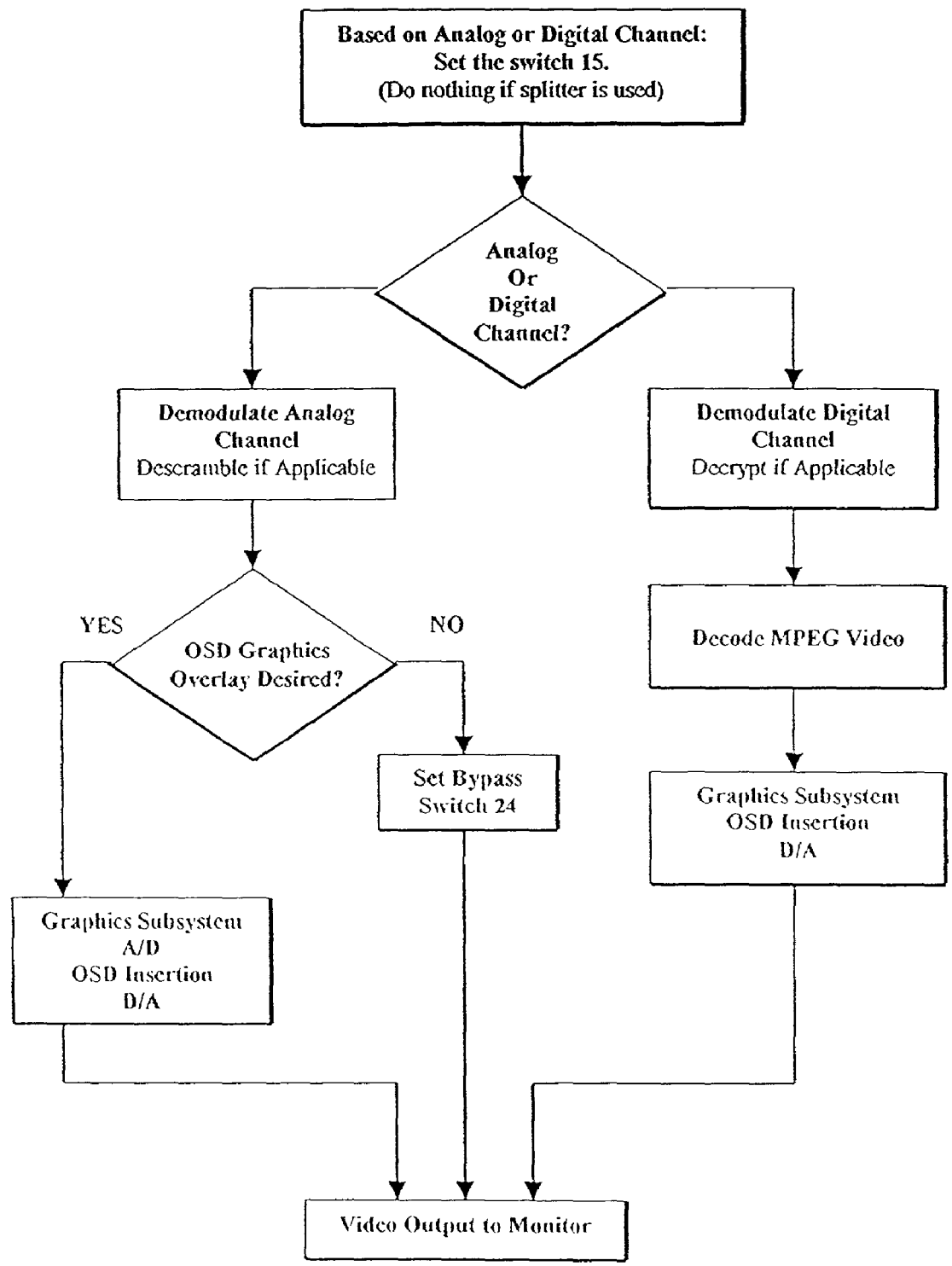
FIG. 2 is a flow diagram for the operation of the system in FIG. 1.

Referring to FIG. 2, general operation of the system 10 of FIG. 1 will now be described. First, an input channel from the tuner 12 is split or switched. Next, a determination is made by the microprocessor 26 whether the channel is digital or analog. If it is a digital channel, demodulation and an MPEG decoding process is initiated through microprocessor control of switch 14 followed by an on-screen display insertion process to insert the OSD information into the digital video input. Following the OSD insertion process a video signal containing both digital video and graphics inserted information is converted to analog at the digital to analog convertor 46 and output to a standard monitor. Returning to the top of FIG. 2, if the channel is analog it is directed along the analog path 19 through microprocessor control of switch 14. It is passed then through the OSD graphics subsystem, or a bypass is activated by the microprocessor 26 to redirect the demodulated input channel directly to the video output 60 for display on a standard monitor.

System operation will now be described in greater detail with reference to FIG. 1. The memory 52 contains OSD graphics image information in digital format which is stored there by the microprocessor 26. It should be understood, that this information may be modified by the microprocessor 26 in order to display different OSD graphics images on the video output 60. The settop terminal 10 receives a cable input from a CATV network via the tuner 12, which selects a desired channel from the cable input. Based upon whether the selected channel is digital or analog, the switch 14 directs the selected channel to the analog channel video demodulator 16 through the analog video path 19 or to a digital channel demodulator 18 through the digital video path 21. These will be referred to as the digital channel and the analog channel. The digital channel typically contains MPEG compressed video, while the analog channel typically contains picture signals such as NTSC or PAL or other standard signals. It should be understood however that each of these channels may carry other information content in the form of analog and digital signals.

The analog channel video demodulator 16 serves to demodulate the analog channel and also optionally serves to descramble any scrambled analog video signal. A demodulated analog video signal is fed from the analog channel video demodulator 16 along the analog video path 19 to both the graphics bypass path 22 and the OSD graphics subsystem 40.

The digital channel demodulator 18 serves to demodulate the digital channel and may optionally de-encrypt any digitally encrypted signal. A demodulated digital signal is fed from the digital channel demodulator 18 along the digital video path 21 to the MPEG decoder 20. It should be understood that while the decoder 20 is shown as an MPEG decoder, other digital compression techniques may be utilized and decoded accordingly. The MPEG decoder 20 serves to decode the MPEG encoded signal into a pure digital video signal, which is fed into the OSD graphics subsystem 40.

The digital video signal coming from the MPEG decoder 20 is fed to the second switch input 47. The switch 43 is operated by the microprocessor 26 to feed the A/D converted video signal to the OSD insertion unit 44 during selected time intervals when the tuner 12 is tuned to an analog channel. The switch 43 is also operated by the microprocessor 26 to feed the digital video signal coming from the MPEG decoder 20 to the OSD insertion unit 44 during other selected time intervals when the tuner 12 is tuned to a digital channel. Depending upon the switch's position, the OSD insertion unit 44 combines the digital video signal from the digital video path 21 or the digitized analog video signal from the analog video path 19 with the desired OSD graphics previously stored in memory 52. The combined or composite signal is then fed to the D/A convertor 46 for conversion to an analog signal, which contains digital or analog video source signals from the tuner 12 and OSD graphics inserted from memory 52. The memory 52 also serves to temporarily store A/D information, D/A information and data for the OSD insertion unit 44.

The graphics bypass switch 24 is controlled by the microprocessor 26 to switch the video output 60 between the graphics bypass path 22 and the OSD graphics subsystem output 50. It should be appreciated that the OSD graphics subsystem, by use of A/D and D/A convertors 42, 46, degrades the signal quality at the video output 60. Therefore, when there is no OSD graphics present for combination with the analog channel, the bypass path 22 serves to pass the analog video signal directly to the video output 60 without any degradation that would otherwise be experienced through the OSD graphics subsystem 40.

An advantage of the present invention is that during intervals when OSD graphics is not required for combination with an analog signal, the analog video signal may be passed directly to a video output 60 without degradation experienced through signal conversions in the OSD graphics subsystem 40.

What is claimed is:

1. A cable television video terminal for selectively combining graphics with video signals, the video terminal comprising:
   (a) a tuner for outputting a video signal;
   (b) a digital channel demodulator configured to output a first digital signal in response to receiving the video signal from the tuner;
   (c) an analog channel demodulator configured to output a first analog signal in response to receiving the video signal from the tuner;
   (d) a video output;
   (e) a processor;
   (f) a video graphics subsystem comprising:
      (i) an analog to digital converter configured to output a second digital signal in response to receiving the first analog signal from the analog channel demodulator;
      (ii) an on-screen display (OSD) insertion unit configured to output a composite digital signal generated by combining OSD graphics with a selected one of the first and second digital signals;
      (iii) a first switch, controlled by the processor, for feeding the first digital signal to the OSD insertion unit during selected time intervals when the tuner is tuned to a digital channel, and for feeding the second digital signal to the OSD insertion unit during selected time intervals when the tuner is tuned to an analog channel; and
      (iv) a digital to analog converter coupled to the OSD insertion unit and configured to output a second analog signal in response to receiving the composite digital signal; and
   (g) a second switch, controlled by the processor, for selectively coupling the video output to the digital to analog converter when the processor determines that OSD graphics are available to be combined with one of the first and second digital signals, and for selectively coupling the video output to the analog to digital converter when the processor determines that there are no OSD graphics available to be combined with the second digital signal.

2. The cable television video terminal of claim 1 further comprising a memory coupled to the processor and the video graphics subsystem for storing information associated with the analog to digital converter and the digital to analog converter.

3. The cable television video terminal of claim 2 wherein the processor generates and stores OSD graphics in the memory.

4. The cable television video terminal of claim 1 further comprising a motion picture expert group (MPEG) decoder coupled to the digital channel demodulator and selectively coupled to the OSD insertion unit, the MPEG decoder for decoding an MPEG signal outputted from the digital channel demodulator.

5. The cable television video terminal of claim 1 wherein the second analog signal is degraded with respect to the first analog signal.

6. The cable television video terminal of claim 1 wherein the tuner outputs the video signal in response to receiving a cable television signal.

7. The cable television video terminal of claim 1 further comprising a third switch coupled to the tuner for selectively inputting the video signal output by the tuner to a selected one of the analog channel demodulator and the digital channel demodulator.

8. The cable television video terminal of claim 1 further comprising a splitter having an input coupled to the tuner, and two outputs coupled to the analog channel demodulator and the digital channel demodulator, respectively.

9. The cable television video terminal of claim 1 wherein the analog channel demodulator includes a descrambler for processing scrambled signals received from the tuner.

10. The cable television video terminal of claim 1 wherein the digital channel demodulator includes a decryptor for processing encrypted digital information received from the tuner.

11. In a cable television video terminal which includes at least one switch controlled by a processor, a method of selectively combining graphics with video signals, the method comprising:
   (a) outputting a first digital signal when the video terminal is tuned to a digital channel;
   (b) outputting a first analog signal when the video terminal is tuned to an analog channel;
   (c) converting the first analog signal into a second digital signal;
   (d) when the processor determines that graphics are available to be combined with the second digital signal:
      (i) the processor controlling the at least one switch such that the video terminal outputs a composite digital signal generated by combining the graphics with the second digital signal;
      (ii) converting the composite digital signal into a second analog signal; and
      (iii) outputting the second analog signal from the video terminal; and
   (e) when the processor determines that graphics are not available to be combined with the second digital signal, the processor controlling the at least one switch such that the first analog signal is output from the video terminal.

12. The method of claim 11 further comprising storing in a memory the graphics in digital format and information associated with the conversions performed in steps (c) and d(ii).

13. The method of claim 11 wherein the graphics are combined with the second digital signal during selected time intervals when the video terminal is tuned to an analog channel.

14. The method of claim 11 further comprising decoding motion picture expert group (MPEG) signals included in the first digital signal into pure digital video signals and combining the graphics with the pure digital video signals during selected time intervals when the video terminal is tuned to a digital channel.

15. The method of claim 11 wherein the second analog signal is degraded with respect to the first analog signal.

16. A cable television video terminal for selectively combining graphics with video signals, the video terminal comprising:
   (a) a first demodulator for outputting a first digital video signal when the video terminal is tuned to a digital channel;
   (b) a second demodulator for outputting a first analog video signal when the video terminal is tuned to an analog channel;
   (c) a first converter for converting the first analog video signal into a second digital video signal;

(d) a graphics inserter for combining graphics with digital signals inputted into the graphics inserter and outputting a composite signal;

(e) a first switch for selectively routing the first digital video signal and the second digital video signal to the graphics inserter;

(f) a second converter for converting the composite signal into a second analog video signal;

(g) a second switch for selectively outputting one of the first and second analog video signals from the video terminal; and (h) a processor for controlling the first and second switches, and determining when graphics are available to be combined with the second digital video signal by the graphics inserter.

17. The cable television video terminal of claim 16 wherein the processor controls the first switch to route the second digital video signal to the graphics inserter when graphics are available to be combined with the second digital signal.

18. The cable television video terminal of claim 16 wherein the processor controls the first switch to route the second digital video signal to the graphics inserter during selected time intervals when the video terminal is tuned to an analog channel.

19. The cable television video terminal of claim 16 wherein the processor controls the first switch to route the first digital video signal to the graphics inserter during selected time intervals when the video terminal is tuned to a digital channel.

20. The cable television video terminal of claim 16 wherein the processor controls the second switch to output the second analog video signal from the video terminal when graphics are available to be combined with the second digital signal.

21. The cable television video terminal of claim 16 wherein the processor controls the second switch to output the first analog video signal from the video terminal when graphics are not available to be combined with the second digital signal.

22. The cable television video terminal of claim 16 wherein the second analog video signal is degraded with respect to the first analog video signal.

* * * * *